US012771947B2

(12) United States Patent
Morita

(10) Patent No.: US 12,771,947 B2
(45) Date of Patent: Oct. 20, 2026

(54) IMAGE CAPTURING APPARATUS AND CONTROL METHOD THEREOF AND STORAGE MEDIUM

(71) Applicant: CANON KABUSHIKI KAISHA, Tokyo (JP)

(72) Inventor: Takuro Morita, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 63 days.

(21) Appl. No.: 18/779,621

(22) Filed: Jul. 22, 2024

(65) Prior Publication Data

US 2024/0380983 A1 Nov. 14, 2024

Related U.S. Application Data

(63) Continuation of application No. 17/727,596, filed on Apr. 22, 2022, now Pat. No. 12,069,378.

(30) Foreign Application Priority Data

Apr. 26, 2021 (JP) ................................ 2021-074411

(51) Int. Cl.
*H04N 23/73* (2023.01)
*H04N 23/71* (2023.01)
*H04N 23/745* (2023.01)

(52) U.S. Cl.
CPC ............. *H04N 23/73* (2023.01); *H04N 23/71* (2023.01); *H04N 23/745* (2023.01)

(58) Field of Classification Search
CPC ....... H04N 23/73; H04N 23/71; H04N 23/745
See application file for complete search history.

(56) References Cited

U.S. PATENT DOCUMENTS

| | | | | |
|---|---|---|---|---|
| 2012/0026358 | A1* | 2/2012 | Hirose | H04N 23/745 348/226.1 |
| 2012/0257082 | A1* | 10/2012 | Kato | H04N 23/745 348/E5.037 |
| 2017/0041522 | A1* | 2/2017 | Nakagawara | H04N 23/745 |
| 2019/0238748 | A1* | 8/2019 | Yoshida | H04N 23/80 |
| 2019/0253604 | A1* | 8/2019 | Noda | H04N 25/44 |
| 2019/0387172 | A1* | 12/2019 | Haruna | H04N 23/672 |
| 2020/0007737 | A1* | 1/2020 | Sugawara | H04N 23/72 |

* cited by examiner

*Primary Examiner* — Jason A Flohre
(74) *Attorney, Agent, or Firm* — Canon U.S.A., Inc. IP Division

(57) ABSTRACT

An apparatus comprises a sensor configured to capture a subject, a photometric unit configured to perform photometry using at least either a first image, or a second image intended for recording, both of which are captured using the sensor, a determination unit configured to determine exposure of the second image to be captured next, based on a result of photometry performed using the image that is less affected by flicker among the first image and the second image, wherein the first image and the second image can be displayed on a display device during continuous shooting using the sensor.

12 Claims, 5 Drawing Sheets

IMAGE CAPTURING APPARATUS AND CONTROL METHOD THEREOF AND STORAGE MEDIUM

CROSS-REFERENCE TO RELATED APPLICATIONS

This application is a Continuation of co-pending U.S. patent application Ser. No. 17/727,596 filed Apr. 22, 2022, which claims priority benefit of Japanese Application No. 2021-074411 filed Apr. 26, 2021. The disclosures of the above-named applications are hereby incorporated by reference herein in their entireties.

BACKGROUND

Technical Field

The aspect of the embodiments relates to a photometry technique for continuous shooting by an image capturing apparatus.

Description of the Related Art

In recent years, there has been a demand for increasing the continuous shooting speed (frame speed) in continuous shooting by an image capturing apparatus such as a digital camera. There has also been a demand for improving the visibility of images on a display device, such as live view (LV, hereinafter) images, which allows for stably capturing the subject within the screen when performing continuous shooting while tracking a moving object, for example.

In order to address such an issue, Japanese Patent Laid-Open No. 2019-79024 discloses a technique called alternate display, which is intended to improve visibility by alternately displaying still images acquired by continuous shooting and display images intended for LV display. However, the alternate display technique has an issue of uneven frame rate when displaying images because the time interval from capturing a still image to capturing a display image is not regular.

As a solution thereof, a continuous shooting control technique such as that illustrated in FIGS. 4A and 4B has been proposed. In the aforementioned technique, while display images are being periodically captured, still images are captured at timings when capturing of the display images is not performed, as illustrated in FIG. 4A. Accordingly, the frame rate stabilizes when displaying images.

On the other hand, Japanese Patent Laid-Open No. 2018-143005 proposes a control related to flicker-free shooting. The foregoing is a shooting function that reduces color heterogeneity and exposure heterogeneity due to the effect of light source flicker when shooting a still image. Specifically, the effect of flicker is reduced by controlling so that the exposure center when shooting a still image coincides with the peak of flicker. The control in the case of performing flicker-free shooting according to the continuous shooting control of FIG. 4A is as illustrated in FIG. 4B. In the acquisition of the still image in FIG. 4B, the timing of capturing is controlled so that the exposure center when shooting a still image coincides with the peak of flicker, as illustrated in FIG. 5.

However, although the continuous shooting control such as that illustrated in FIG. 4B can reduce the effect of flickering light source on still images being shot, display images for LV display may be affected by flicker. In addition, when performing photometry based on a display image affected by flicker, exposure of still images may vary.

SUMMARY

According to a first aspect of the embodiments, there is provided an apparatus comprising: a sensor configured to capture a subject; at least one processor; and a memory coupled to the at least one processor, the memory having instructions that, when executed by the processor, performs operations as: a photometric unit configured to perform photometry using at least either a first image, or a second image intended for recording, both of which are captured using the sensor; a determination unit configured to determine exposure of the second image to be captured next, based on a result of photometry performed using the image that is less affected by flicker among the first image and the second image, wherein the first image and the second image can be displayed on a display device during continuous shooting using the sensor.

According to a second aspect of the embodiments, there is provided a method for controlling an apparatus comprising a sensor configured to capture a subject, the method comprising: performing photometry using at least either a first image, or a second image intended for recording, both of which are captured using the sensor; determining exposure of the second image to be captured next, based on a result of photometry performed using the image that is less affected by flicker among the first image and the second image, wherein the first image and the second image can be displayed on a display device during continuous shooting using the sensor.

Further features of the disclosure will become apparent from the following description of exemplary embodiments with reference to the attached drawings.

DESCRIPTION OF THE EMBODIMENTS

Figure 1:
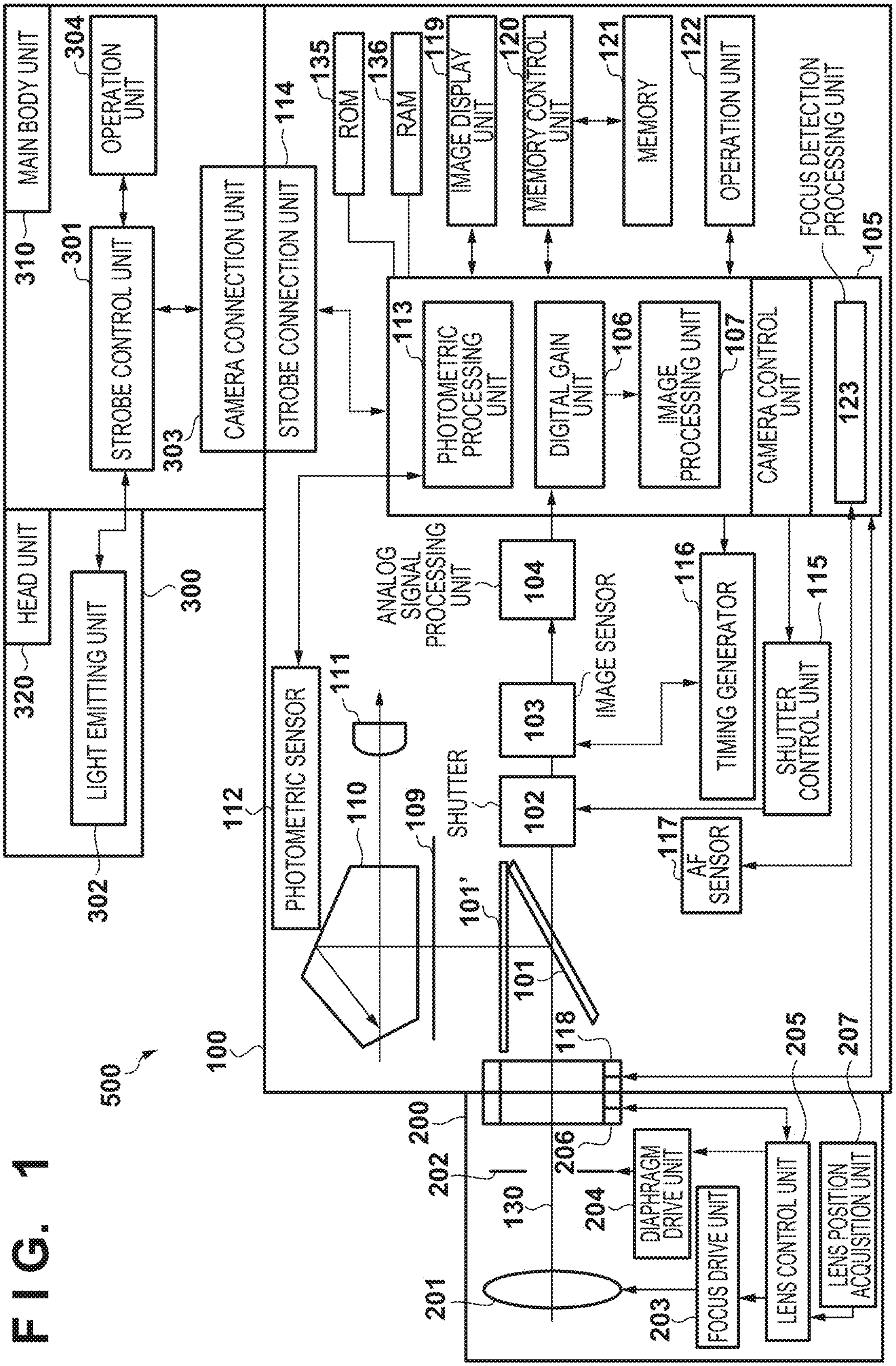
FIG. 1 is a block diagram illustrating a configuration of a digital camera, which is a first embodiment of an image capturing apparatus of the disclosure.

Hereinafter, embodiments will be described in detail with reference to the attached drawings. Note, the following embodiments are not intended to limit the scope of the disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

First Embodiment

FIG. 1 is a block diagram illustrating a configuration of a digital camera, which is a first embodiment of an image capturing apparatus of the disclosure. In FIG. 1, a digital camera (hereinafter referred to as camera) 500 includes a camera body 100, a lens unit 200, and a strobe 300 that illuminates a subject. Here, although the present embodiment is described taking as an example of a single-lens digital camera whose lens unit is exchangeable with respect to the camera body, the disclosure is also applicable to a lens-integrated camera. In addition, the disclosure is also applicable to a camera without a strobe.

First, description will be provided, referring to FIG. 1. In the camera body 100, a main mirror 101, which is rotatable in accordance with the operating state of the camera 500, is inserted diagonally into an image capturing optical path 130 when observing a subject through a finder, and guides a light flux from the lens unit 200 to a finder optical system described below. In addition, the main mirror 101 retracts from the image capturing optical path 130 during shooting, whereby the light flux from the lens unit 200 is guided to an image sensor 103. A position on the image capturing optical path 130 at which the main mirror 101 is provided is indicated by a solid line, and a position 101' of the main mirror 101 having retracted from the image capturing optical path is indicated by a dotted line.

A shutter 102 is provided to control incidence of the light flux from the lens unit 200 on the image sensor 103, and driven such that the shutter 102 is normally in a closed state and is in an open state during shooting. The shutter 102 is controlled by a camera control unit 105 via a shutter control unit 115.

The image sensor 103 is, for example, a CMOS sensor or a CCD sensor that captures the subject. The image sensor 103 is driven based on a timing signal output from a timing generator 116 to photoelectrically convert an optical image of the subject converting into an analog signal. An analog signal processing unit 104 samples and holds the analog signal output from the image sensor 103, adds an analog gain thereto, converts it into a digital signal by A/D conversion, and outputs. The camera control unit 105 performs digital signal processing described below on the digital signal output from the analog signal processing unit 104, and stores it in the memory 121 via a memory control unit 120.

A digital gain unit 106 adds a digital gain to the digital image signal and outputs the signal to the image processing unit 107. An image processing unit 107 performs various digital signal processing such as pixel interpolation processing or color conversion processing, for example. An image display unit 119 is a back side monitor configured to display (that can display) images or shooting information, including an image display device such as an LCD, for example.

An operation unit 122 includes various types of operation members serving as input units that accept operations from the user. The operation unit 122 includes an autofocus (AF) instruction button, a shooting instruction button and various types of operation buttons, and transmits input operations performed by the user to the camera control unit 105.

A focusing plate 109, which is provided on a primary imaging plane of the lens unit 200, and including a Fresnel lens (collective lens) on an incident surface, and forms an optical image (finder image) of the subject on an exit surface. A penta prism 110, which is an optical member that changes the finder optical path, converts a subject image formed on the exit surface of the focusing plate 109 into an erected normal image. An eye piece lens 111 is configured so that it can adjust the diopter in accordance with the user's eye when the user looks into the finder. A photometric sensor 112, which is formed of photodiodes corresponding to respective divided areas of the capturing area, outputs luminance of the subject image formed on the exit surface of the focusing plate 109 to a photometric processing unit 113.

An AF sensor 117 outputs a defocus amount to the camera control unit 105. The camera control unit 105 determines a lens drive amount based on a defocus amount provided from the AF sensor 117, and drives the lens unit 200 via communication terminals 118 and 206. The camera control unit 105, which is a microcomputer including a CPU, controls the camera 500 as a whole by deploying a program stored in a ROM 135 to a RAM 136 and executing the same.

The lens unit 200 is a shooting lens which is exchangeable on the camera body 100. A lens 201 is configured as a lens group including, for example, a focusing lens and a zoom lens, and introduces light reflected from the subject into the camera body 100. A diaphragm 202 adjusts the light amount during shooting by adjusting the aperture diameter thereof. The aperture diameter of the diaphragm 202 is controlled by the lens control unit 205 with a diaphragm drive unit 204. A focus drive unit 203, upon receiving an instruction from the lens control unit 205, performs focusing by shifting the position of the lens 201.

The lens control unit 205 controls respective units included in the lens unit 200. Furthermore, the lens control unit 205 can obtain information of distance to the zoom position (focal length information) or the focal plane of the lens, based on the position information of the lens 201 provided from a lens position acquisition unit 207. The communication terminal 206 is a communication terminal through which the lens unit 200 communicates with the camera body 100, and the communication terminal 118 is a communication terminal through which the camera body 100 communicates with the lens unit 200. The lens unit 200 communicates with the camera control unit 105 within the camera body 100 via the communication terminals 206 and 118.

The strobe 300, which is attachable to and detachable from the camera body 100, includes a main body unit 310 and a head unit 320. A strobe control unit 301 performs light emission control and also controls input from an operation unit 304 or the like. A light emitting unit 302 emits light according to a light emission instruction from the strobe control unit 301. The operation unit 304 includes various types of operation members serving as input units that accept operations from the user. The operation unit 304 includes various types of operation buttons such as a light emission mode setting change button, and transfers input operations performed by the user to the strobe control unit 301. A camera connection unit 303 is a unit connecting to the camera body 100, and the strobe control unit 301 communicates with the camera control unit 105 via the camera connection unit 303, and the strobe control unit 114 of the camera body 100.

Figure 2:
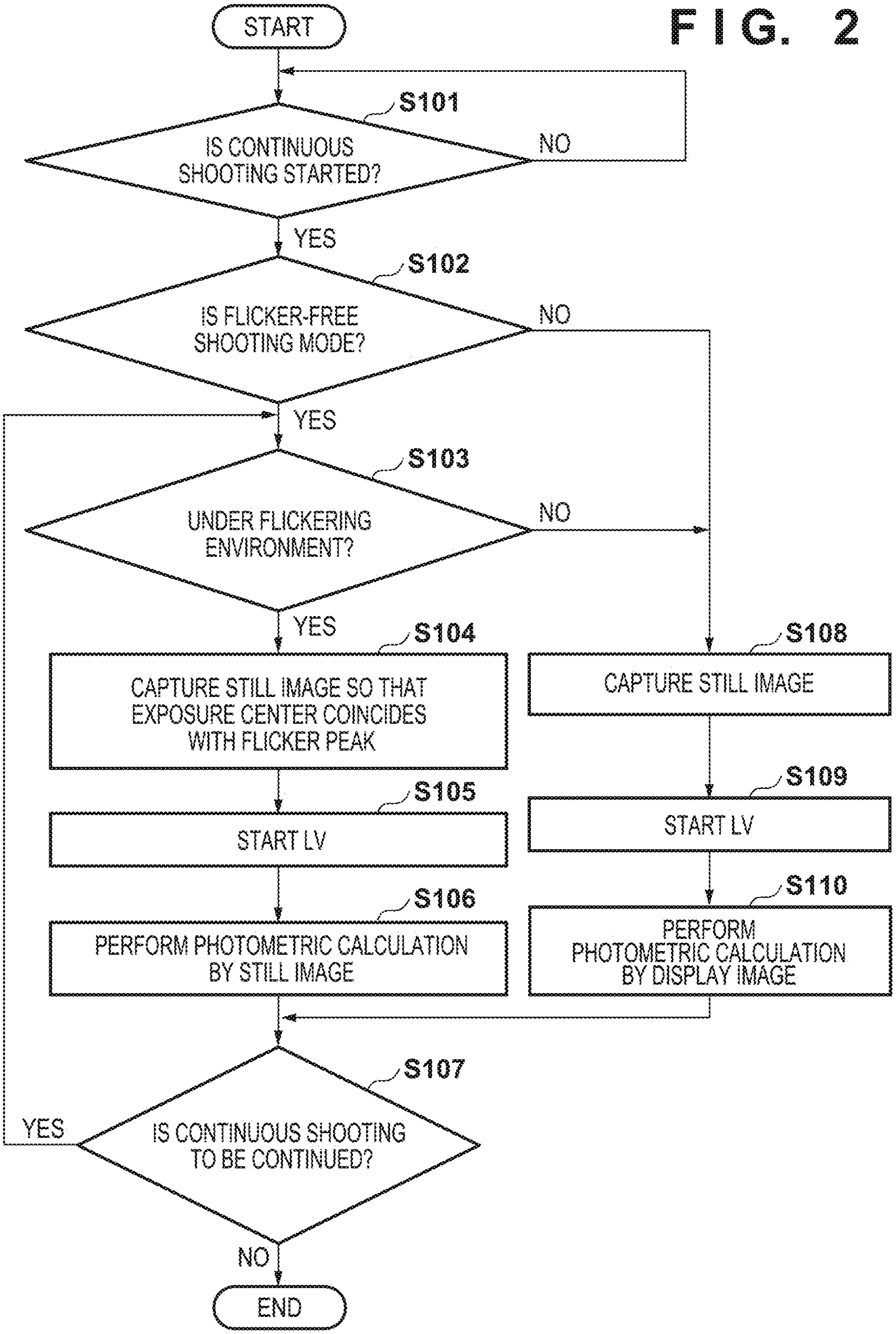
FIG. 2 is a flowchart illustrating continuous shooting control of a camera in the first embodiment.

Next, FIG. 2 is a flowchart illustrating continuous shooting performed by the camera 500 according to the present embodiment.

At step S101, the camera control unit 105 determines whether or not start of continuous shooting is instructed. Specifically, it is determined whether or not an instruction to start continuous shooting is issued by the operation unit 122 included in the camera body 100. If start of continuous shooting is instructed, the process flow proceeds to step S102, otherwise waits in situ.

At step S102, the camera control unit 105 determines whether or not the shooting mode is a flicker-free shooting mode. The flicker-free shooting mode is a setting set by the operation unit 122 included in the camera body 100, and stored in the memory 121. The operation unit 122 can switch the flicker-free shooting mode in which flicker-free shooting can be executed, and a normal mode in which the timing of exposure of the image sensor 103 is controlled regardless of flicker. As a result of the determination, the process flow proceeds to step S103 when the shooting mode is determined to be the flicker-free shooting mode, otherwise the process flow proceeds to step S108.

At step S103, the camera control unit 105 determines, from flicker detection information which has been detected before start of shooting, whether or not the shooting environment is under a flickering environment where flicker is present. Specifically, the camera control unit 105 performs continuous capture at a predetermined period upon activation or immediately before starting of shooting, and determines, from the variation characteristics of the luminance signal value in the continuously acquired results of capturing, whether or not the shooting environment is under a flickering environment. In other words, the present embodiment determines whether or not flicker is occurring to an extent equal to or larger than a predetermined amount (level) of light (equal to or larger than a predetermined level), based on variation of luminance based on a plurality of signals (image signals) acquired for flicker detection. Here, the flicker detection method is not limited the foregoing, and there may be a configuration that allows for detecting whether or not flicker is occurring and the level of flicker using other methods. When the shooting environment is under a flickering environment, the process flow proceeds to step S104, otherwise proceeds to step S108.

At step S104, the camera control unit 105 performs flicker-free shooting. Flicker-free shooting is a shooting control that reduces the effect of flicker by performing a control so that the exposure center timing when shooting a still image coincides with the peak timing of flicker. When flicker-free shooting is performed, the process flow proceeds to step S105.

At step S105, the camera control unit 105 causes the image sensor 103 to capture an image (display image) for live view.

At step S106, the camera control unit 105 performs photometric calculation using the still image acquired at step S104. Accordingly, an exposure for subsequent shooting is determined.

Subsequently, at step S107, the camera control unit 105 determines whether or not continuous shooting is to be continued. The foregoing is determined based on whether or not the shooting instruction from the operation unit 122 is continuing. When continuous shooting is continued, the process flow returns to step S103, otherwise the process is terminated.

When, on the other hand, the shooting mode is determined at step S102 not to be the flicker-free shooting mode, or the shooting environment is determined at step S103 not to be under a flickering environment, the camera control unit 105 performs still image capturing at step S108. However, the capturing described herein does not perform any control such as causing the exposure center timing to coincide with the peak timing of flicker when shooting a still image, as described with regard to step S104.

After a still image is captured at step S108, the camera control unit 105 causes, at step S109, the image sensor 103 to capture an image for live view, and performs LV display.

At step S110, the camera control unit 105 performs photometric calculation using the display image (live view display image) acquired at step S109. Accordingly, an exposure for subsequent shooting is determined.

As has been described above, when shooting is being performed under a flickering environment, in the continuous shooting of flicker-free shooting, photometry from a still image with reduced effect of flicker allows for shooting a still image without unevenness of exposure. On the other hand, when the environment is not a flickering environment (effect of flicker being equal to or lower than a predetermined degree), performing photometry from a display image (LV image) immediately before shooting allows for applying the latest photometric value taken more immediately before shooting to the exposure for the next shooting of a still image.

In addition, even when shooting is being performed under a flickering environment, exposure for the next shooting of a still image may be determined based on a result of photometry performed using an image that is less affected by flicker among a still image intended for recording and a live view image intended for display.

Second Embodiment

Figure 3:
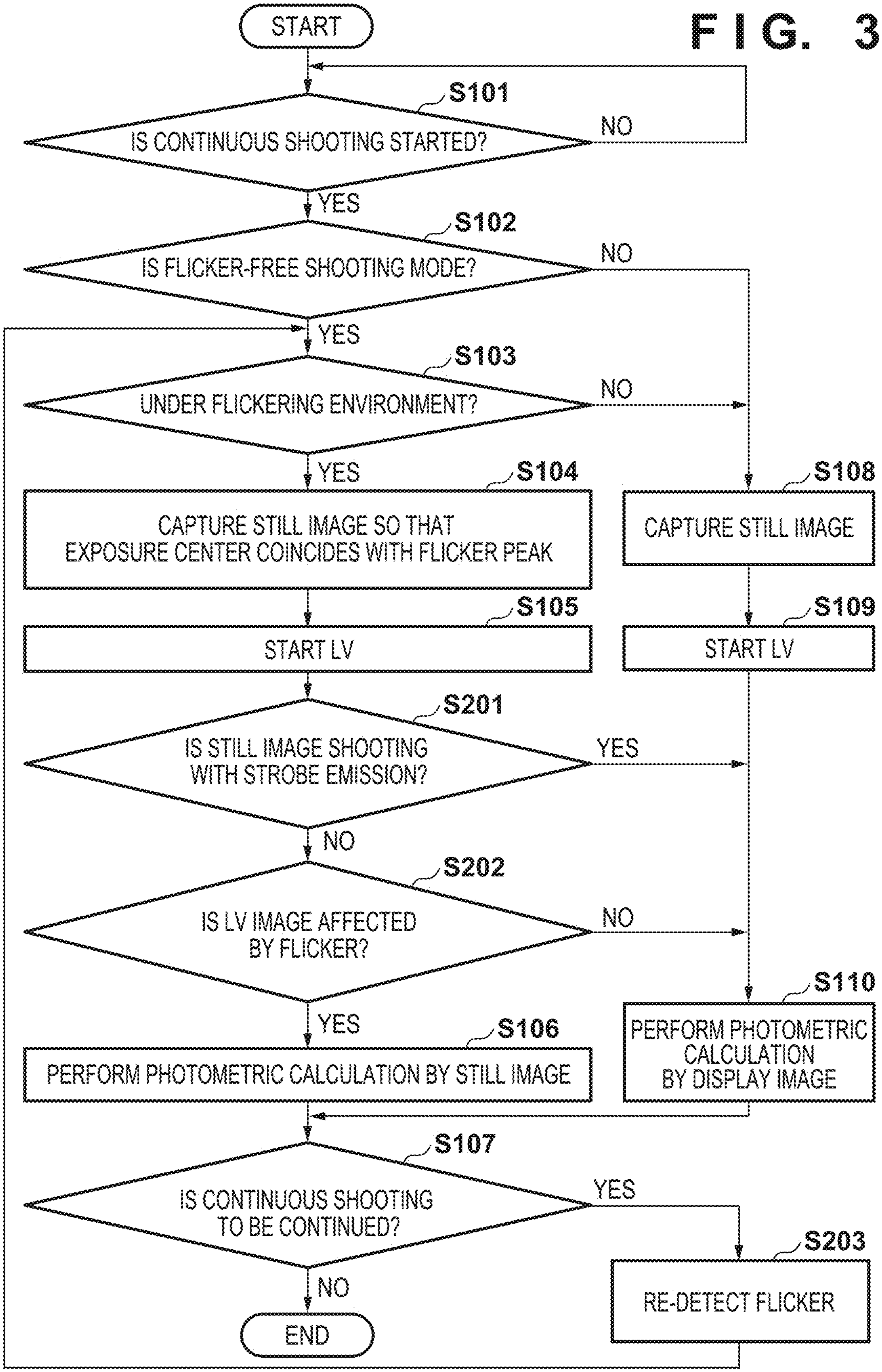
FIG. 3 is a flowchart illustrating continuous shooting control of a camera in a second embodiment.
Figure 4A:
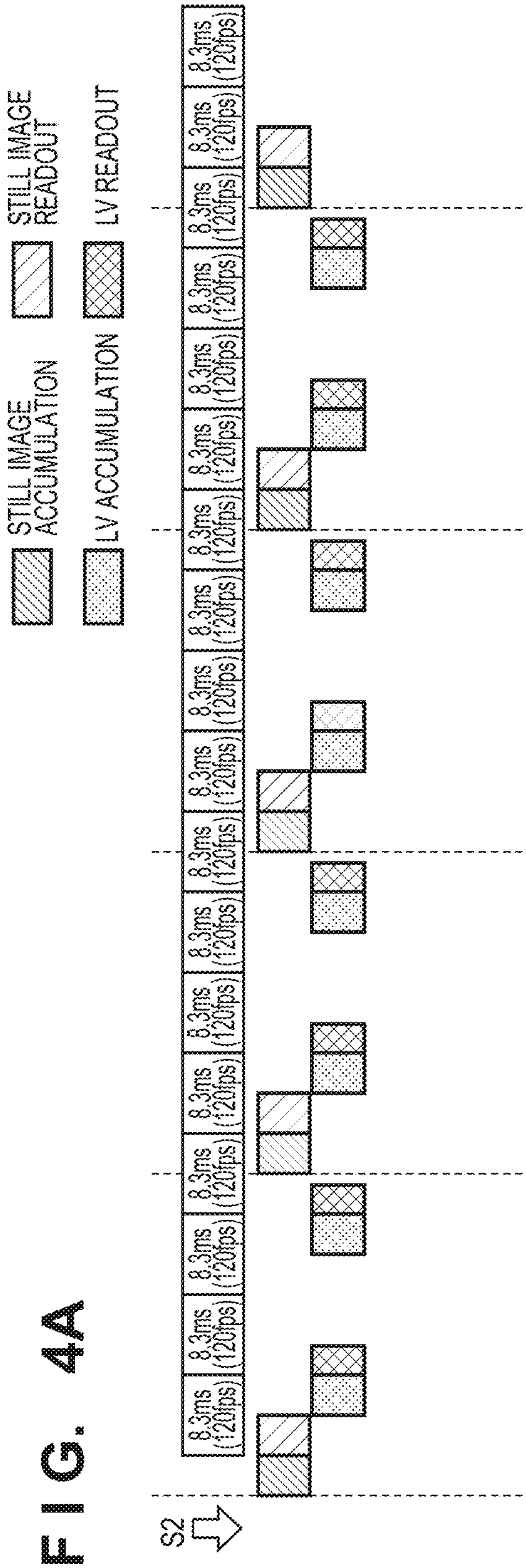
FIGS. 4A and 4B are timing charts illustrating conventional examples.
Figure 4B:
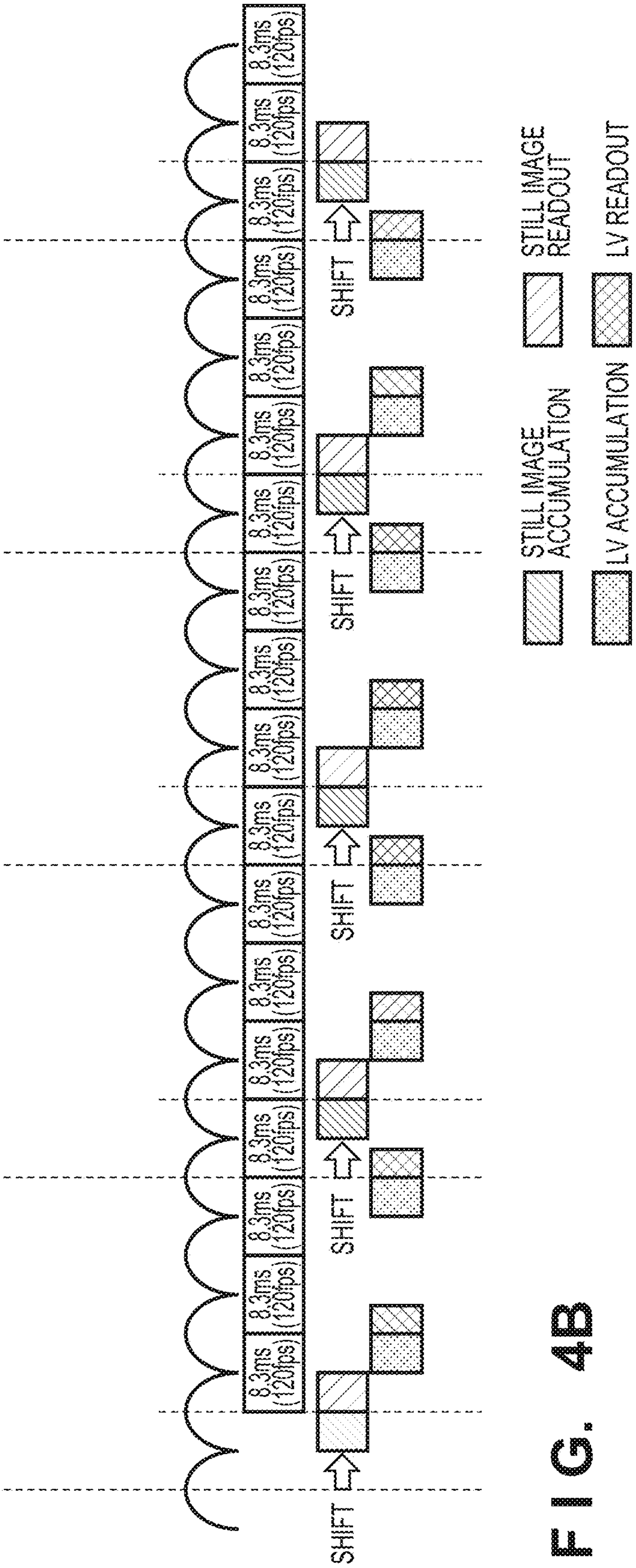
Figure 5:
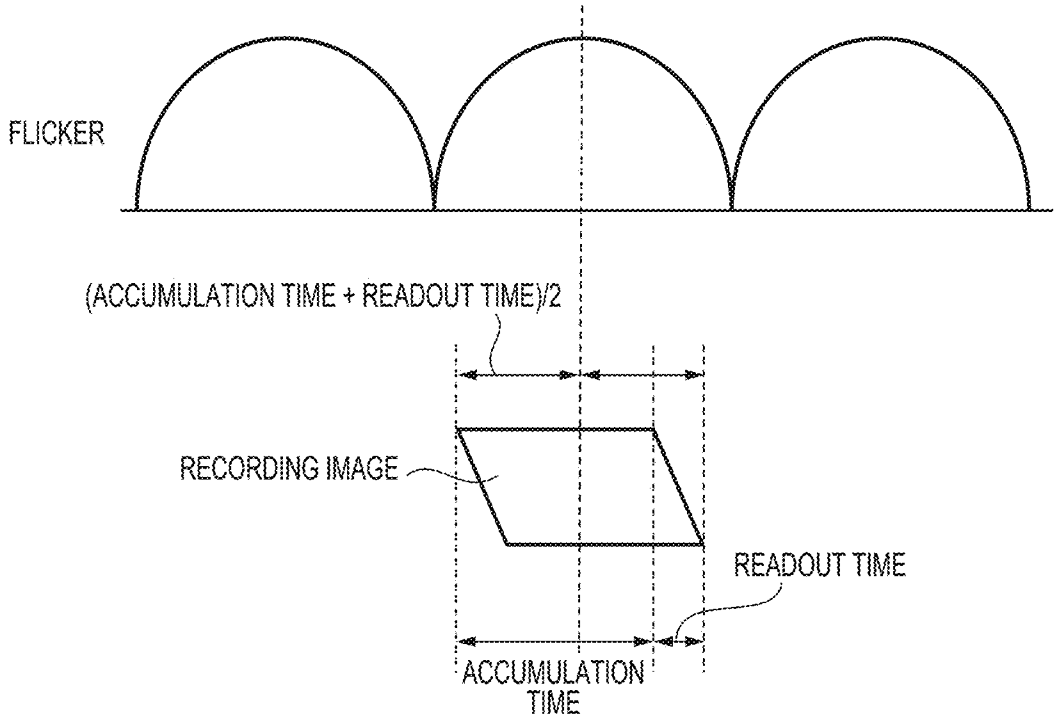
FIG. 5 is illustrating a state in which an exposure center coincides with a peak of flicker when shooting a still image.

In the following, there will be described continuous shooting control of a camera according to a second embodiment. Here, the processing from S101 to S109 illustrated in FIG. 3 is the same as that illustrated in FIG. 2 of the first embodiment, and therefore description thereof will be omitted.

At step S201, the camera control unit 105 determines whether or not light was being emitted by the strobe 300 when shooting a still image at step S104. In this determination, the process flow proceeds to step S202 in a case where light was not being emitted when shooting a still image. In a case where light was being emitted when shooting a still image, the process flow proceeds to step $110 to perform photometric calculation from a display image.

At step S202, the camera control unit 105 determines whether or not the display image captured for LV after the flicker-free shooting of step S104 is affected by flicker. Specifically, it is determined whether or not the display image is captured for an accumulation time, which is an integer multiple of a flickering period of 1/100 seconds (or 1/120 seconds), allowing an image not to be affected by flicker under a flickering environment with a fluorescent lamp or the like flickering at a rate of 100 Hz (or 120 Hz). In a case where the display image was captured for an accumulation time (exposure time), which is an integer multiple of the flickering period, and is not affected by flicker, the process flow proceeds to step S110 to perform photometric calculation from the display image. In a case where the display image is affected by flicker, the process flow proceeds to step S106 to perform photometric calculation from the still image.

Additionally, in a case where it is determined at step S107 that continuous shooting is to be continued, the camera control unit 105 performs re-detection of flicker at step S203.

As has been described above, in a case where light is being emitted by the strobe also when flicker-free shooting is being performed, photometric calculation is performed from the display image, taking into account that correct photometric calculation from the still image may become impossible due to the effect of light emission. In addition, it is determined whether or not there exists an effect of the flicker light source in the display image, and it is determined from which of the still image or the display image photometric calculation is to be performed. The foregoing processes allows for shooting a still image without unevenness of exposure under a flickering environment. Furthermore, periodically performing re-detection of flicker during continuous shooting allows for switching between performing photometry based on a display image or a still image, even when the environment changes from "with flicker" to "without flicker", or from "without flicker" to "with flicker" during continuous shooting.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An apparatus comprising:

a sensor configured to capture a subject;

at least one processor; and a memory coupled to the at least one processor, the memory having instructions that, when executed by the processor, performs operations as:

a detection unit configured to detect flicker, a photometric unit configured to perform photometry using at least either a first image, or a second image, both of which are captured using the sensor, wherein the first image is a live view image to be displayed on a display device and the second image is a still image intended for recording; and a determination unit configured to determine exposure of an image to be captured next, based on a result of photometry performed using an image among the first image and the second image, wherein a timing when the first image is captured is closer to a capturing timing of the image to be captured next than a timing when the second image is captured, wherein the determination unit determines exposure of the image to be captured next, based on a result of photometry performed using the second image, in a case where the detection unit has detected flicker equal to or higher than a predetermined level, and wherein the determination unit determines exposure of the image to be captured next, based on a result of photometry performed using the first image, in a case where the detection unit has not detected any flicker equal to or higher than a predetermined level.

2. The apparatus according to claim 1, wherein the first image and the second image can be displayed on a display device during continuous shooting using the sensor.

3. The apparatus according to claim 1, wherein the second image is a still image acquired by continuous shooting.

4. The apparatus according to claim 1, wherein the first image is an image different from still image acquired by continuous shooting but a display image displayed on the display device during continuous shooting.

5. The apparatus according to claim 1, wherein, the determination unit, when the first image is acquired in an accumulation time in which the detection unit has not detected any flicker equal to or higher than the predetermined level, determines exposure of the image to be captured next, based on a result of photometry performed using the first image.

6. The apparatus according to claim 1, wherein the at least one processor further performs operations as:

a control unit that can execute flicker-free shooting, which controls exposure of the sensor so as to cause an exposure timing of the sensor in accordance with a predetermined timing of a light amount change of the flicker.

7. The apparatus according to claim 6, wherein, the control unit, when capturing the second image in an environment where flicker is present, captures the second image by the flicker-free shooting.

8. The apparatus according to claim 6, wherein the at least one processor further performs operations as:

a switching unit configured to switch a flicker-free shooting mode in which flicker-free shooting is executed, and a normal mode in which the timing of exposure of the sensor is controlled regardless of flicker.

9. The apparatus according to claim 1, wherein, when capturing the first image in an environment where flicker is present, the first image is captured by setting the exposure time of the sensor to an integer multiple of the flickering period.

10. The apparatus according to claim 1, further comprising a light emission device configured to illuminate a subject, wherein the determination unit determines exposure of the image to be captured next, based on a result of photometry performed using the first image, in a case where the light emission device was emitting light when capturing the second image.

11. A method for controlling an apparatus comprising a sensor configured to capture a subject, the method comprising:

detecting flicker;

performing photometry using at least either a first image, or a second image, both of which are captured using the sensor, wherein the first image is a live view image to be displayed on a display device and the second image is a still image intended for recording; and determining exposure of an image to be captured next, based on a result of photometry performed using an image among the first image and the second image, wherein a timing when the first image is captured is closer to a capturing timing of the image to be captured next than a timing when the second image is captured, wherein exposure of the image to be captured next is determined based on a result of photometry performed using the second image, in a case flicker equal to or higher than a predetermined level has been detected, and wherein exposure of the image to be captured next is determined based on a result of photometry performed using the first image, in a case any flicker equal to or higher than a predetermined level has not been detected.

12. A non-transitory computer-readable storage medium storing a program for causing a computer to execute each step of a control method of an apparatus comprising a sensor configured to capture a subject, the method comprising;

detecting flicker;

performing photometry using at least either a first image, or a second image, both of which are captured using the sensor, wherein the first image is a live view image to be displayed on a display device and the second image is a still image intended for recording; and determining exposure of the second image to be captured next, based on a result of photometry performed using the image among the first image and the second image, wherein a timing when the first image is captured is closer to a capturing timing of the image to be captured next than a timing when the second image is captured, wherein exposure of the image to be captured next is determined based on a result of photometry performed using the second image, in a case flicker equal to or higher than a predetermined level has been detected, and wherein exposure of the image to be captured next is determined based on a result of photometry performed using the first image, in a case any flicker equal to or higher than a predetermined level has not been detected.

* * * * *